No. 867,927.
PATENTED OCT. 8, 1907.
W. M. POTTER.
MITER BOX.
APPLICATION FILED APR. 27, 1905.
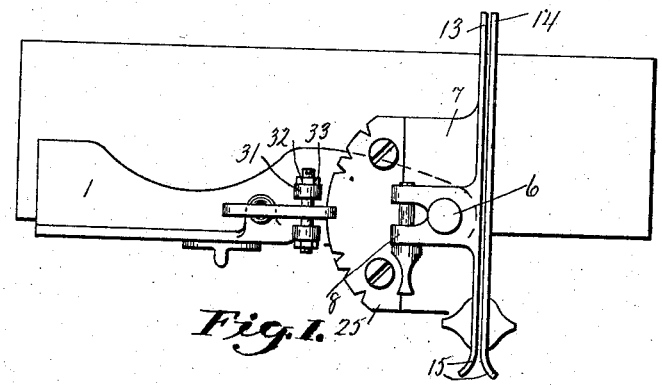
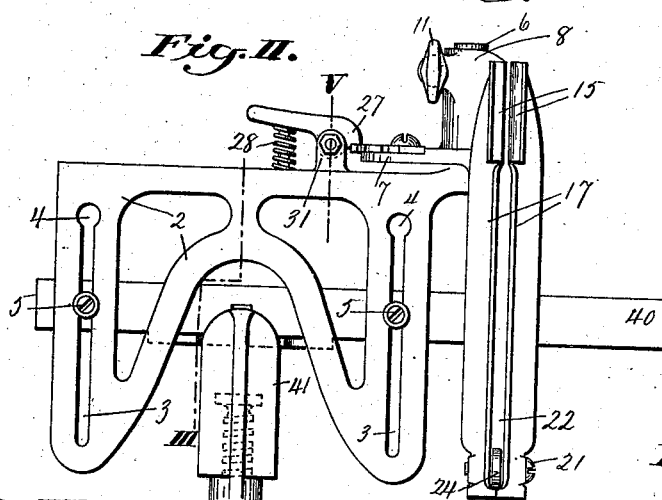
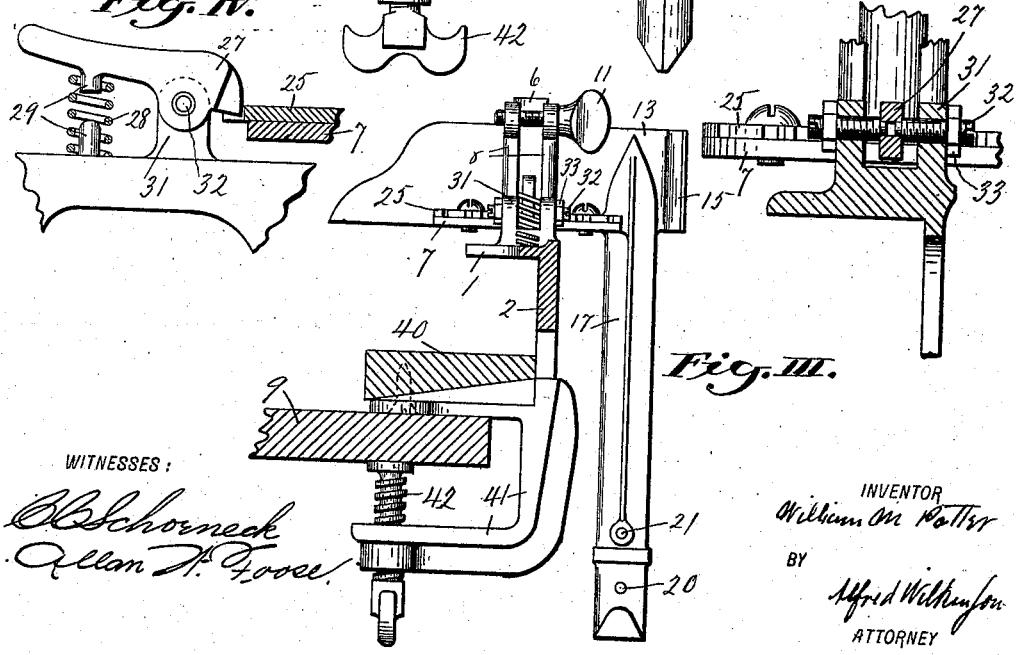
WITNESSES:
INVENTOR
William M. Potter
BY
Alfred Wilkinson
ATTORNEY

UNITED STATES PATENT OFFICE.

WILLIAM M. POTTER, OF SYRACUSE, NEW YORK, ASSIGNOR TO E. C. STEARNS & COMPANY, OF SYRACUSE, NEW YORK, A CORPORATION OF NEW YORK.

MITER-BOX.

No. 867,927.  Specification of Letters Patent.  Patented Oct. 8, 1907.

Application filed April 27, 1905. Serial No. 257,646.

*To all whom it may concern:*

Be it known that I, WILLIAM M. POTTER, a citizen of the United States, residing at Syracuse, in the county of Onondaga and State of New York, have invented certain new and useful Improvements in Miter-Boxes; and I do hereby declare the following to be a full, clear, and exact description of the invention, such as will enable others skilled in the art to which it appertains to make and use the same.

My invention relates to a folding miter box and saw-guide by which the saw is adjusted to cut boards or materials accurately at the usual angles to form miter joints.

To that end my invention consists in a frame which may be secured easily to bench or other support, jaws journaled thereon to receive the saw and means automatically to lock the jaws in the various angles, right or left also in certain details of construction.

My invention will be understood by reference to the drawing herewith, in which the reference numerals of the specification indicate the corresponding parts in all the figures.

Figure I is a top plan view showing my invention. Fig. II is a side elevation. Fig. III is a vertical cross section on line III of Fig. II. Fig. IV is an enlarged detail showing the means of locking the jaws in adjusted position. Fig. V is an enlarged cross section on line V of Fig. II.

In the drawing is shown the base composed of the integral top plate 1 and face plate 2, arranged at right angles so as to fit a square edge, the latter being provided with vertical grooves 3, terminating at their upper ends in enlargements 4, to receive the screws 5 so that the miter box may be easily secured to a supporting plate or directly to the bench 9, timber, etc., or to any flat surface having a square edge, and vertically adjustable thereon to receive, under its top plate, the molding of any usual width.

To the outer end of the top plate, and inside the line of the inner face of the face plate, is secured a bearing pin 6, to which is fitted a flat platform 7 and clamping sleeve 8, provided with thumb screw 11, whereby the engagement of the platform and the saw jaws carried thereby may be tightened or loosened on the pin. This journal bearing is arranged within the inner face of the face plate to strengthen the parts and produce a more compact device, and the bearing is elongated to overcome possible wear and looseness which would affect the accuracy of the sawed angle.

Integral with the platform and the split sleeve are the inner and outer jaws 13 and 14, outwardly flared at their outer ends 15 to permit the insertion of the saw blade, and are provided with downwardly depending shanks 17, connected by screws 20, 21, by which the outer jaw is secured in position. Screw 21 spans the cut-out 22 between the shanks, whereby the distance between their jaws and their engagement with the saw blade may be somewhat varied, and on said screw may be strung a disk 24 of wood or other soft material, which prevents injury to the teeth of the saw after it has completed the cut.

To platform 7 is secured the graduated, segmental plate 25 having notches on its edge with which automatically engages the indexing latch 27, forced into engagement with the respective notches by spring 28, fitted to guide lugs 29 29, as the jaws are swung on their bearing. These notches may desirably be numbered respectively, on both sides of the center 22½, 30 and 45, to indicate the usual angles, or with other desirable indicating numbers. The segmental plate and indexing latch are made of tempered, spring steel so they can not become worn by use to affect the accuracy of the angle. The latch may desirably be journaled between two ears 31, as shown in Fig. V, by two bearing screws 32, provided with lock nuts 33, so that the lock nuts may be loosened and the latch given a slight, lateral adjustment to one side or the other when desirable.

As here shown, the miter box may be attached to a supporting plate 40, carrying a bench-clamp 41, having a clamping thumb-screw 42, by which the complete device may be clamped on the bench.

Having thus described my invention, what I claim as new and desire to secure by Letters Patent, is:—

In a folding miter-box, the combination with the base composed of a face-plate and integral top-plate arranged at a right angle to the face-plate, whereby the base fits a square edge of a round bearing pin on the upper surface of the top-plate near one end and arranged within the plane of the face-plate, a clamping sleeve fitted to said pin and adapted to turn thereon, means to clamp said sleeve on the pin in fixed position, a downwardly depending inner shank and an inner jaw transversely arranged on the upper end of the shank, said jaw and shank being integral with the sleeve, a corresponding outer shank and jaw, said outer shank being secured to said inner shank at their lower ends, by two screws, and said shanks having correspondingly flaring outer ends and flat, vertically arranged faces arranged parallel and close together, an integral platform on the inner face of the sleeve arranged parallel to the top plate, a segmental plate on said platform having a notched inner edge and indicating numerals on its upper surface, a spring latch on the top plate to engage with said notches, a supporting plate of greater width, thickness and length than the top-plate arranged parallel thereto on the inner face of the face-plate, means to secure said supporting plate to the inner face of the face-plate at adjustable distances from the top-plate, and a bench clamp secured on said supporting plate, substantially as described and shown.

In testimony whereof I affix my signature in presence of two witnesses.

WILLIAM M. POTTER.

Witnesses:
M. B. SMITH,
ALLAN W. FOOSE.